United States Patent
Morioka et al.

(10) Patent No.: US 7,018,562 B2
(45) Date of Patent: Mar. 28, 2006

(54) COMPRESSION MOLDED PRODUCT OF QUICK-DISSOLVING CHLORINATED ISOCYANURIC ACID

(75) Inventors: Shigeru Morioka, Tokushima (JP); Yoshiya Iwasaki, Tokushima (JP); Yasufumi Seo, Tokushima (JP)

(73) Assignee: Shikoku Corporation, Kagawa (JP)

( * ) Notice: Subject to any disclaimer, the term of this patent is extended or adjusted under 35 U.S.C. 154(b) by 182 days.

(21) Appl. No.: 10/657,125

(22) Filed: Sep. 9, 2003

(65) Prior Publication Data

US 2004/0051079 A1    Mar. 18, 2004

(30) Foreign Application Priority Data

Sep. 12, 2002 (JP) ............. P. 2002-266472
Aug. 19, 2003 (JP) ............. P. 2003-295580

(51) Int. Cl.
    *A01N 43/64* (2006.01)
(52) U.S. Cl. .................. 252/186.21; 252/186.2
(58) Field of Classification Search ............ 252/186.2, 252/186.21
    See application file for complete search history.

(56) References Cited

U.S. PATENT DOCUMENTS

| 3,446,893 A | * | 5/1969 | Hanford et al. ............ 424/76.3 |
| 3,873,685 A | * | 3/1975 | Kibbel et al. ............... 424/405 |
| 4,149,988 A | | 4/1979 | Brennan et al. |
| 5,021,186 A | * | 6/1991 | Ota et al. .............. 252/186.35 |

FOREIGN PATENT DOCUMENTS

| JP | 51-139628 | 12/1976 |
| JP | 53-136520 | 11/1978 |
| JP | 54-160730 A | 12/1979 |
| JP | 7-69813 A | 3/1995 |

* cited by examiner

*Primary Examiner*—Matthew A. Thexton
(74) *Attorney, Agent, or Firm*—Sughrue Mion, PLLC

(57) ABSTRACT

A compression molded product of quick-dissolving chlorinated isocyanuric acid, comprising:
  (a) trichloroisocyanuric acid,
  (b) sodium dichloroisocyanurate anhydrous salt,
  (c) magnesium sulfate and/or aluminum sulfate, and
  (d) calcium carbonate.

4 Claims, No Drawings

COMPRESSION MOLDED PRODUCT OF QUICK-DISSOLVING CHLORINATED ISOCYANURIC ACID

FIELD OF THE INVENTION

The present invention relates to a chlorinated isocyanuric acid molded product having a quick-dissolving property, specifically, to a chlorinated isocyanuric acid molded product capable of quickly dissolving through expansion and disintegration in water when immersed in water and providing a high concentration of active chlorine.

The molded product is most suitable for superchlorination in a swimming pool and even besides the swimming pool, is suitably used in any place where a high concentration of active chlorine is required.

BACKGROUND ART

Chlorinated isocyanuric acids are chemically stable solid compounds and are easy to handle. When dissolved in water, they are hydrolyzed to release active chlorine having a bactericidal activity. Since the active chlorine is excellent in stability and the bactericidal performance persists over a long period of time, the compounds are widely used as a bactericidal disinfectant for pool water, sewage water, and effluent from a human-waste treatment plant and as an algicide or an algae-proofing agent for cooling water of machinery and equipment.

As such chlorinated isocyanuric acid compounds, representative compounds include trichloroisocyanuric acid, dichloroisocyanuric acid, sodium dichloroisocyanurate and hydrates thereof, and potassium dichloroisocyanurate.

Among the chlorinated isocyanuric acid compounds, trichloroisocyanuric acid has the most high effective chlorine content of about 90% but the solubility in water is low as 1.2 g and hence the dissolution rate is slow, so that the compound is suitable for supplying a small amount of active chlorine over a long period of time but cannot be used for so-called superchlorination wherein water for a pool is treated with a high concentration of active chlorine prior to use.

On the other hand, since sodium salt or potassium salt of dichloroisocyanuric acid has a large solubility in water of about 25 g and a fast dissolution rate, it is suitable for the application of supplying a high concentration of active chlorine but it has a disadvantage that the effective chlorine content is low as about 60% and thus a large amount of the agent should be used.

In order to improve such problems, there is proposed a bactericidal disinfectant tablet wherein trichloroisocyanuric acid and sodium salt of dichloroisocyanuric acid are mixed (for example, JP-A-51-139628 and JP-A-53-136520).

However, since such a tablet is highly hygroscopic, there arises a problem that it is chemically decomposed during storage to generate chlorine gas. Moreover, when immersed in water, the tablet swells and disintegrates, but a satisfactory dissolution rate is not yet obtained.

Furthermore, JP-A-54-160730 proposes a tablet wherein trichloroisocyanuric acid and an alkali metal salt of cyanuric acid as a disintegrating agent are mixed. This tablet is excellent in storage stability but a satisfactory quick-dissolution is not yet attained and it has a disadvantage that an effective chlorine content is low.

SUMMARY OF THE INVENTION

In consideration of the above circumstances, it is an object of the invention to provide a chlorinated isocyanuric acid molded product excellent in storage stability and moldability, which is excellent in disintegration when immersed in water, exhibits a fast dissolution rate, and is capable of supplying quickly a high concentration of active chlorine.

As a result of extensive studies for solving the above problems, the present inventors have found that when a molded product comprising a composition obtainable by mixing (a) trichloroisocyanuric acid, (b) sodium dichloroisocyanurate anhydrous salt, (c) magnesium sulfate and/or aluminum sulfate, and (d) calcium carbonate is immersed in water, the product can quickly disintegrates and dissolves to form a high concentration of active chlorine in a short period of time, and additionally the product exhibits an improved storage stability as compared with the above tablet and also an excellent moldability. Based on these findings, they have accomplished the invention.

In other words, the invention has the following constitution.

(1) A compression molded product of quick-dissolving chlorinated isocyanuric acid, comprising:
(a) trichloroisocyanuric acid,
(b) sodium dichloroisocyanurate anhydrous salt,
(c) magnesium sulfate and/or aluminum sulfate, and
(d) calcium carbonate.

(2) The compression molded product according to the above (1), wherein
the component (a) is contained in an amount of from 40 to 50% by weight,
the component (b) is contained in an amount of from 40 to 50% by weight,
the component (c) is contained in an amount of from 1 to 5% by weight, and
the component (d) is contained in an amount of from 1 to 10% by weight
each based on all the components.

(3) The compression molding product according to the above (1), wherein
the component (a) has a particle size of 400 µm or less and contains particles having a particle size of 75 µm or less in an amount of from 70 to 90% by weight based on all the particles of the component (a), and
the component (b) has a particle size of 600 µm or less and contains particles having a particle size of from 150 to 450 µm in an amount of 90% by weight or more based all the particles of the component (b).

(4) The compression molded product according to the above (1), wherein the component (d) has a particle size of 15 µm or less and has an average particle size of 3 µm or less.

(5) A process for producing the compression molded product according to the above (1), which comprises molding under compression a composition comprising:
(a) trichloroisocyanuric acid,
(b) sodium dichloroisocyanurate anhydrous salt,
(c) magnesium sulfate and/or aluminum sulfate, and
(d) calcium carbonate.

DETAILED DESCRIPTION OF THE INVENTION

In the invention, trichloroisocyanuric acid and sodium dichloroisocyanurate anhydrous salt which are chlorinated isocyanuric acids are used in combination. The sodium dichloroisocyanurate anhydrous salt acts as a disintegrating agent when the molded product is brought into contact with water.

That is, sodium dichloroisocyanurate may be present as anhydrous salt, and monohydrate and dihydrate as hydrates. The anhydrous salt causes a hydration reaction when brought into contact with water to change into monohydrate or dihydrate. At that time, the volume of the particles of sodium dichloroisocyanurate expands and thereby the molded product containing the anhydrous salt disintegrates in water.

The mixing amounts of trichloroisocyanuric acid and sodium dichloroisocyanurate anhydrous salt for use in the invention are preferably each from 40 to 50% by weight.

When the amount of trichloroisocyanuric acid is 50% by weight or less or when the amount of sodium dichloroisocyanurate anhydrous salt is 40% by weight or more, a satisfactory disintegrating property can be obtained.

When the amount of trichloroisocyanuric acid is 40% by weight or more or when the amount of sodium dichloroisocyanurate anhydrous salt is 50% by weight or less, disintegrating property is good and the content of effective chlorine in the molded product does not decrease, and therefore the cases are preferable.

Within the range of the mixing amount, the dissolution rate and supplying amount of active chlorine can be controlled by arbitrarily setting the mixing ratio of trichloroisocyanuric acid and sodium dichloroisocyanurate anhydrous salt.

(a) Trichloroisocyanuric acid for use in the invention is a powdery one, and preferably has a particle size of 400 μm or less and preferably contains particles having a particle size of 75 μm or less in an amount of from 70 to 90% by weight based on all the particles of the component (a).

The lower limit of a particle size of the component (a) is not especially limited, and is preferably 10 μm or more.

The dissolution rate of trichloroisocyanuric acid is largely influenced by the particle size. When the particles having a particle size of 400 μm or less are contained or the particles having a particle size of 75 to 400 μm are contained in an amount of 30% by weight or less, the particles of trichloroisocyanuric acid are dissolved and the dissolution rate does not decrease.

Moreover, when the particles having a particle size of 75 μm or less are contained in an amount of 90% by weight or less, there do not arise problems in moldability that powder of trichloroisocyanuric acid flies in all directions to deteriorate working environment and capping may occur.

Furthermore, although trichloroisocyanuric acid dissolves slowly, when the particles having a particle size of 75 μm or less is contained in an amount of 70% by weight or more, in addition to the increase of surface area, the dissolution of trichloroisocyanuric acid is accelerated by the occurrence of weak neutralization reaction between trichloroisocyanuric acid as an acidic agent and nearly neutral quick-dissolving sodium dichloroisocyanurate owing to the coexistence of both compounds.

(b) the sodium dichloroisocyanurate anhydrous salt for use in the invention is a powdery one, and preferably has a particle size of 600 μm or less and preferably contains particles having a particle size of 150 to 450 μm in an amount of 90% by weight or more.

The lower limit of a particle size of the component (b) is not especially limited, and is preferably 50 μm or more.

When the sodium dichloroisocyanurate anhydrous salt contains particles having a particle size of 600 μm or less or contains particles having a particle size of 450 μm or more in an amount of 10% by weight or less, the resulting molded product has a increased disintegrating property. When the particles having a particle size of less than 150 μm are contained in an amount of 10% by weight or less, moldability under pressing is excellent.

Magnesium sulfate and aluminum sulfate for use in the invention has an action to prevent decomposition of chlorinated isocyanuric acids and to enhance storage stability of the chlorinated isocyanuric acid molded product. The mixing amount is preferably from 1 to 5% by weight. When the amount is 1% by weight or more, it can be expected to improve storage stability of the molded product. When the amount is 5% by weight or less, the mixing ratio of chlorinated isocyanuric acids in the molded product does not decrease to result that the content of effective active chlorine is not decreased.

Such magnesium sulfate and aluminum sulfate may be used alone individually or in combination of two or more thereof.

In this regard, U.S. Pat. No. 4,149,988 describes an example wherein magnesium sulfate is used as a decomposition inhibitor.

Besides, U.S. Pat. No. 5,021,186 describes an example wherein aluminum sulfate is used as a decomposition inhibitor.

Calcium carbonate for use in the invention acts as a regulator of breaking strength (hardness) of the molded product. That is, when molding under pressing is carried out by mixing calcium carbonate with chlorinated isocyanuric acids, the breaking strength of the molded product can be lowered as compared with the case that calcium carbonate is not mixed and hence the disintegration of the molded product can be accelerated when it is immersed in water.

In this case, when the particle size of calcium carbonate is 15 μm or less or the average particle size is 3 μm or less, the mixing amount thereof is not increased and as a result, the mixing ratio of chlorinated isocyanuric acids does not decrease to result that the content of effective active chlorine is not decreased.

Moreover, when the mixing amount thereof is 1% by weight or more, the breaking strength of the molded product can be lowered to such a degree that disintegration is accelerated. Furthermore, when the amount is 10% by weight or less, the disintegration rate increases and there does not arise a problem that the mixing ratio of chlorinated isocyanuric acids decreases to result in a decreased effective active chlorine content.

Within the above ranges of particle size distribution and mixing ratio, the resulting molded product has such a breaking strength that prevents shape-losing during its transportation and handling without meaninglessly decreasing an effective chlorine content.

In this regard, an example is known wherein calcium carbonate as a pH regulator is mixed with trichloroisocyanuric acid and then a molded product is formed (JP-A-7-69813).

Furthermore, in carrying out the invention, a lubricant such as magnesium stearate, calcium stearate, or talc may be added, if necessary.

With regard to the molded product of the invention, the shape is not limited and any shape may be allowable unless inconvenience at molding and practical use occurs. For example, in the case of cylindrical tablets, molding can be effected under a tableting pressure of about 500 to 1500 kg/cm$^2$ using a usual tableting machine. In the case of briquettes, molding can be effected under a pressing pressure of roll pressure (static pressure) of 4 to 5 tons using a twin-roll granulator.

EXAMPLES

The following will describe the invention specifically with reference to Examples and Comparative Examples but the invention is not limited thereto.

The materials and evaluation test methods used in Examples are as follows.

(Starting Materials)

Trichloroisocyanuric acid (manufactured by SHIKOKU CORPORATION, effective chlorine content=91.1%)

A product having a particle size distribution of 16% by weight of particles having a particle size of 75 to 400 μm and 84% by weight of particles having a particle size of 75 μm or less was used.

Sodium dichloroisocyanurate anhydrous salt (manufactured by SHIKOKU CORPORATION, effective chlorine content=63.5%)

A product having a particle size distribution of 2% by weight of particles having a particle size of 450 to 600 μm, 93% by weight of particles having a particle size of 150 to 450 μm, and 5% by weight of particles having a particle size of 150 μm or less was used.

Magnesium sulfate anhydrous salt (manufactured by Umai Kasei Kogyo, "MN-00", an average particle size: 75 μm)

Aluminum sulfate anhydrous salt (manufactured by TAIMEI CHEMICALS CO., LTD., TAIACE "S-150", an average particle size: 10 to 12 μm)

Calcium carbonate (manufactured by Nitto Funka Kogyo, "NS#100")

A product having a particle size of 15 μm or less and an average particle size of 2.12 μm was used.

(Disintegration Test)

A wire netting of 12 mesh (mesh opening 1.4 mm) was attached to a 2 L beaker at the height of about 10 cm from the bottom. One tablet of a sample was placed on the wire netting and water was charged so that the sample was sufficiently immersed (water amount: 2 L). Under gentle stirring of water by means of a stirring bar, a time required for disintegration of the sample was measured. It was judged that the shorter the time for disintegration is, the more excellent the disintegrating property is.

(Dissolution Test)

In a similar manner to the above disintegration test, one tablet of a sample was immersed in water and an active chlorine concentration in water after the passage of 30 minutes was measured. From the value, a dissolved rate (%) of the sample was determined. It was judged that the larger the dissolved rate is, the more excellent the quick-dissolving property is.

(Storage Stability Test)

One tablet of a sample was placed in a 1 L plastic vessel and left on standing in a constant temperature and humidity chamber set at a relative humidity of 75% and a temperature of 40° C. for 1 day, 4 days, and 7 days. Thereafter, a chlorine gas concentration (ppm) in the space of the plastic vessel was measured by means of a gas detecting tube (manufactured by GASTECH CORPORATION). It was judged that the lower the chlorine gas concentration is, the more excellent the storage stability is.

Examples 1 to 6, Comparative Examples 1 to 3

Trichloroisocyanuric acid, sodium dichloroisocyanurate anhydrous salt, magnesium sulfate, aluminum sulfate and calcium carbonate were mixed in the ratios (% by weight) shown in Table 1, respectively, and then briquette-like molded products having a diameter of 18 mm and a weight of about 1.7 g were prepared under a pressing pressure of roll pressure (static pressure) of 4 to 5 tons using a granulator (twin rolls of 76.2 mm width, size of roll pocket: diameter of 18.5 mm, depth of 9 mm, rotation speed of 9 rpm).

At the molding, no lamination (laminate exfoliation) occurred and the resulting molded products had a sufficient strength, and a good moldability was observed.

The resulting molded products were subjected to the disintegration test and dissolution test and the test results were as shown in Table 1.

TABLE 1

|  |  | Example | | | | | | Comparative Example | | |
|---|---|---|---|---|---|---|---|---|---|---|
|  |  | 1 | 2 | 3 | 4 | 5 | 6 | 1 | 2 | 3 |
| Composition | TICA (*1) | 48 | 47 | 46 | 49 | 48 | 47 | 100 | 85 | 50 |
|  | SDIC (*2) | 50 | 49 | 48 | 40 | 50 | 49 | — | 15 | 50 |
|  | Magnesium sulfate | 1 | 1 | 1 | 1 | — | — | — | — | — |
|  | Aluminum sulfate | — | — | — | — | 1 | 1 | — | — | — |
|  | Calcium carbonate | 1 | 3 | 5 | 10 | 1 | 3 | — | — | — |
| Test | Disintegration time (sec) | 51 | 32 | 21 | 15 | 55 | 33 | Not disintegrated | 330 | 60 |
|  | Dissolved rate (%, after 30 min) | 99.5 | 99.8 | 99.8 | 99.8 | 99.8 | 99.8 | 0.1 | 16.5 | 55 |

(*1) TICA represents trichloroisocyanuric acid.
(*2) SDIC represents sodium dichloroisocyanurate anhydrous salt.

According to the test results shown in Table 1, all the chlorinated isocyanuric acid molded products of the invention exhibit a short disintegration time, i.e., within 60 seconds and thus have an excellent disintegrating property. Moreover, the dissolved rate after 30 minutes of immersion is nearly 100% and thus the products are found to be excellent in quick-dissolving property.

Examples 7 to 10, Comparative Example 4

Trichloroisocyanuric acid, sodium dichloroisocyanurate anhydrous salt, magnesium sulfate, aluminum sulfate and calcium carbonate were mixed in the ratios (% by weight) shown in Table 2, respectively, and then briquette-like molded products were prepared as in Examples 1 to 6.

The resulting molded products were subjected to the storage stability test and the test results were as shown in Table 2.

TABLE 2

| | | Example | | | | Comparative Example |
|---|---|---|---|---|---|---|
| | | 7 | 8 | 9 | 10 | 4 |
| Composition | TICA (*1) | 48 | 46 | 48 | 47 | 49 |
| | SDIC (*2) | 50 | 48 | 50 | 49 | 50 |
| | Magnesium sulfate | 1 | 3 | — | — | — |
| | Aluminum sulfate | — | — | 1 | 1 | — |
| | Calcium carbonate | 1 | 3 | 1 | 3 | 1 |
| Test | Chlorine gas concentration (after 1 day, ppm) | 30 | 25 | 35 | 45 | 50 |
| | Chlorine gas concentration (after 4 days, ppm) | 95 | 70 | 105 | 130 | 150 |
| | Chlorine gas concentration (after 7 days, ppm) | 150 | 90 | 165 | 250 | 300 |

(*1) TICA represents trichloroisocyanuric acid.
(*2) SDIC represents sodium dichloroisocyanurate anhydrous salt.

According to the test results shown in Table 2, the chlorinated isocyanuric acid molded products of the invention exhibit a reduced generation of chlorine gas as a decomposition gas and thus are excellent in storage stability.

The compression molded product of quick-dissolving chlorinated isocyanuric acid of the invention is excellent in storage stability and moldability. Also, the product is excellent in disintegrating property when immersed in water and has a fast dissolution rate in water, so that it is suitable for the application, such as superchlorination for a swimming pool, wherein a high concentration of active chlorine should be quickly supplied.

What is claimed is:

1. A compression molded product of quick-dissolving chlorinated isocyanuric acid, comprising:
    (a) trichloroisocyanuric acid contained in an amount of from 40 to 50% by weight,
    (b) sodium dichloroisocyanurate anhydrous salt contained in an amount of from 40 to 50% by weight,
    (c) magnesium sulfate and/or aluminum sulfate contained in an amount of from 1 to 5% by weight, and
    (d) calcium carbonate contained in an amount of from 1 to 10% by weight, each based on all the components.

2. The compression molding product according to claim 1, wherein
    the component (a) has a particle size of 400 μm or less and contains particles having a particle size of 75 μm or less in an amount of from 70 to 90% by weight based on all the particles of the component (a), and
    the component (b) has a particle size of 600 μm or less and contains particles having a particle size of from 150 to 450 μm in an amount of 90% by weight or more based all the particles of the component (b).

3. The compression molded product according to claim 1, wherein the component (d) has a particle size of 15 μm or less and has an average particle size of 3 μm or less.

4. A process for producing the compression molded product according to claim 1, which comprises molding under compression a composition comprising:
    (a) trichloroisocyanuric acid contained in an amount of from 40 to 50% by weight,
    (b) sodium dichloroisocyanurate anhydrous salt contained in an amount of from 40 to 50% by weight,
    (c) magnesium sulfate and/or aluminum sulfate contained in an amount of from 1 to 10% by weight, and
    (d) calcium carbonate contained in an amount of from 1 to 10% by weight, each based on all the components.

* * * * *